(12) United States Patent
Radu et al.

(10) Patent No.: US 12,437,305 B2
(45) Date of Patent: Oct. 7, 2025

(54) COMPUTER IMPLEMENTED METHOD AND SYSTEM FOR REQUESTING CONSENT FROM A CONSUMER TO COMPLETE AN ACTION

(71) Applicant: MASTERCARD INTERNATIONAL INCORPORATED, Purchase, NY (US)

(72) Inventors: Cristian Radu, Beauvechain (BE); Valerie Wouters, Genval (BE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 91 days.

(21) Appl. No.: 18/020,194

(22) PCT Filed: Aug. 19, 2021

(86) PCT No.: PCT/US2021/046615
§ 371 (c)(1),
(2) Date: Feb. 7, 2023

(87) PCT Pub. No.: WO2022/051096
PCT Pub. Date: Mar. 10, 2022

(65) Prior Publication Data
US 2023/0298038 A1    Sep. 21, 2023

(30) Foreign Application Priority Data

Sep. 2, 2020   (GB) ..................... 2013767

(51) Int. Cl.
*G06Q 20/42*    (2012.01)
*G06Q 20/40*    (2012.01)
*G06Q 30/0201*  (2023.01)

(52) U.S. Cl.
CPC ........... *G06Q 20/42* (2013.01); *G06Q 20/403* (2013.01); *G06Q 30/0206* (2013.01)

(58) Field of Classification Search
CPC ... G06Q 20/42; G06Q 20/403; G06Q 30/0206
See application file for complete search history.

(56) References Cited

U.S. PATENT DOCUMENTS

| | | | |
|---|---|---|---|
| 2009/0164274 A1 | 6/2009 | Narayanaswamy et al. | |
| 2012/0215610 A1* | 8/2012 | Amaro ................ | G06Q 30/02 705/14.51 |

(Continued)

FOREIGN PATENT DOCUMENTS

| | | | |
|---|---|---|---|
| CN | 111275285 | * 12/2019 | ....... G06Q 10/06313 |
| JP | 2002092029 A | 3/2002 | |
| WO | 2015167915 A1 | 6/2009 | |

OTHER PUBLICATIONS

Park, Hye Lyun, "International Search Report", International Patent Application No. PCT/US2021/046615, mailed Dec. 9, 2021, 4 pages.

(Continued)

*Primary Examiner* — Scott S Trotter
(74) *Attorney, Agent, or Firm* — Barta Jones, PLLC

(57) ABSTRACT

The present invention relates to a method (10) of requesting consent from a consumer to complete an action. The method (10) comprises: determining (1) a time interval during which a probability of a consumer providing consent to complete the action exceeds a probability of the consumer not providing consent to complete the action; and requesting (2) consent from the consumer to complete the action during the time interval. Also disclosed is a system (30) for requesting consent from a consumer to complete an action. The system (30) comprises a probability processor (31) and a request processor (32). The probability processor (31) is configured to determine a time interval during which a probability of a consumer providing consent to complete the action exceeds a probability of the consumer not providing consent to complete the action. The request processor (32) is config- (Continued)

ured to request consent from the consumer to complete the action during the time interval. The action may comprise: a payment transaction, an exchange of data, and/or an update to terms and conditions of use or a service agreement. The method (10) and/or system (30) may be used in the completion of a merchant-initiated transaction.

20 Claims, 6 Drawing Sheets

(56) References Cited

U.S. PATENT DOCUMENTS

| | | |
|---|---|---|
| 2017/0004408 A1 | 1/2017 | Edelen et al. |
| 2019/0295126 A1 | 9/2019 | Madden |
| 2019/0392441 A1* | 12/2019 | Lee ..................... G06N 20/00 |

OTHER PUBLICATIONS

Park, Hye Lyun, "Written Opinion", International Patent Application No. PCT/US2021/046615, mailed Dec. 9, 2021, 4 pages.

\* cited by examiner

COMPUTER IMPLEMENTED METHOD AND SYSTEM FOR REQUESTING CONSENT FROM A CONSUMER TO COMPLETE AN ACTION

CROSS-REFERENCE TO RELATED APPLICATION

This application claims the benefit of, and priority to, International Patent Application No. PCT/US21/46615 filed on Aug. 19, 2021, which claims the benefit of, and priority to, United Kingdom Patent Application No. 2013767.5, filed Sep. 2, 2020. The entireties of each disclosure of the above applications are incorporated herein by reference.

TECHNICAL FIELD

The present invention relates to a computer implemented method of requesting consent from a consumer to complete an action, and a system for requesting consent from a consumer to complete an action. The present invention also relates to a system for completing an action.

BACKGROUND

In order to complete an action between a consumer and a merchant, for example a payment transaction, the consumer may be required to consent to completing the action. For example, a merchant initiated transaction may require consent from a consumer to complete the transaction. A merchant initiated transaction is initiated by a merchant on behalf of a consumer, pursuant to an agreement between the merchant and the consumer. For example, a merchant may provide a subscription service requiring a monthly fee, and the user may agree to the merchant initiating payment of the fee on an agreed date each month.

In order to obtain consent from a consumer to complete an action, a request for consent may need to be sent to the consumer. For example, if a merchant wishes to increase the monthly fee of a subscription service and/or update the terms and conditions of the subscription service, a request for consent to complete future transactions with the increased fee and/or under the updated terms and conditions may need to be sent to the consumer. A consumer may not be available to provide consent when consent is required by the merchant. Alternatively, the consumer may be available to provide consent, but it may not be an appropriate time for them to do so. For example, the request for consent may be sent on a day on which the subscription fee is due and before the consumer has received a monthly wage, meaning that the consumer may not have sufficient funds to pay the increased fee on that day.

Another example of an action which may require consent from a consumer is an exchange of data. As well as obtaining consent to complete a payment transaction, it may also be desirable for a merchant to access data relating to a consumer that is hosted by an issuer of a payment device (for example a credit or debit card). An example of such data is an age of a consumer, which the merchant may be required to verify before providing age restricted goods, such as alcohol, to the consumer. An exchange of such data from the issuer to the merchant may require the consumer's consent. The merchant may require this data at a time when the consumer may not be available to provide consent. In another example, a third party Open Banking application developer may wish to access transaction data hosted by a payment network, for example the Mastercard® payment network. Access of such data may require the consent of a consumer.

Another example of an action which may require consent from a consumer is an update to terms and conditions of use of a product or service, such as software or a rental agreement, used by the consumer.

Sending a digital request for consent to a consumer and subsequently sending a digital confirmation of the consent to a merchant both utilise computing and network resources. Each request and confirmation has an associated cost and hardware consumption. It is therefore desirable to reduce the number of requests and confirmations sent in order to complete a given transaction.

Having to consent to completion an action on multiple occasions may cause inconvenience for a consumer. This may also cause inconvenience for the merchant, as the user may not be available to provide consent when the merchant wishes to complete the action.

SUMMARY OF INVENTION

An aspect of the invention provides a computer implemented method of requesting consent from a consumer to complete an action. The method comprises: determining a time interval during which a probability of the consumer providing consent to complete the action exceeds a probability of the consumer not providing consent to complete the action; and requesting consent from the consumer to complete the action during the time interval.

The action may comprise: a payment transaction, an exchange of data, and/or an update to terms and conditions of use or a service agreement. The action may comprise any action which requires consent from a consumer to complete.

The probability of the consumer not providing consent may comprise a probability of the consumer rejecting the request for consent, i.e. explicitly not providing consent, and/or a probability of the consumer not responding to the request for consent.

Any suitable means may be used to determine the time interval. Determining the time interval may comprise using artificial intelligence (AI). Determining the time interval may comprise determining a value of one or more attributes. Determining the time interval may comprise determining the outcome of one or more decisions of a Boolean decision tree, each outcome of a given decision corresponding to a value of a given attribute. The one or more attributes may be selected based on historical data related to the availability of different consumers, during certain time intervals, to provide consent to complete a transaction. The one or more decisions of the Boolean decision tree and the order in which the decisions are arranged within the decision tree may be selected based on historical data, or may be selected by an algorithm in to which is fed historical data. Any suitable means may be used to design the Boolean decision tree.

The time interval may comprise a first time interval, and the method may comprise determining a second time interval (during which a probability of the consumer providing consent to complete the action exceeds a probability of the consumer not providing consent to complete the action) if the consumer does not provide consent in response to requesting consent from the consumer to complete the action during the first time interval.

The method may comprise determining a plurality of time intervals during which a probability of the consumer providing consent to complete the action exceeds a probability of the consumer not providing consent to complete the action. The method may comprise requesting consent from the consumer to complete the action during a first time interval of the plurality of time intervals, wherein the probability of the consumer providing consent to complete the action is highest during the first time interval. The method may comprise requesting consent from the consumer to complete the action during a second time interval of the plurality of time intervals, wherein the probability of the consumer providing consent to complete the action is second highest during the second time interval, if the consumer does not provide consent in response to requesting consent from the consumer during the first time interval.

The method may comprise determining a value of one or more financial solvability attributes of an account designated by the consumer to provide funds to complete the action, and determining the time interval in dependence on the value of the one or more financial solvability attributes. The one or more financial solvability attributes may comprise one or more of: a date interval when a value of funds paid in to the designated account exceeds the value of funds payable from the designated account; a size of a margin of the designated account; whether or not providing consent to complete the action prior to a specified date will result in a payment reduction.

The method may comprise determining a value of one or more personal attributes of the consumer, and determining the time interval in dependence on the value of the one or more personal attributes of the consumer. Each personal attribute may relate to any personal attribute that has been shown to have a statistical relationship with a likelihood of a consumer providing consent to complete an action during a given time interval. The one or more personal attributes may comprise one or more of: an age of the consumer; a gender of the consumer; a marital status of the consumer; an education level of the consumer; and a work occupancy of the consumer.

The method may comprise determining a value of one or more attributes of a portable communications device associated with the consumer, and determining the time interval in dependence on the value of the one or more attributes of the portable communications device associated with the consumer. The one or more attributes of the portable communications device associated with the user may comprise one or more of: a power status of the device; a connectivity status of the device, for example if the device has a mobile internet connection (e.g. 4G, 5G etc.), a Wi-Fi connection, or no internet connection; and a location of the device.

The method may comprise determining a value of one or more attributes relating to payment behaviour of the consumer, and determining the time interval in dependence on the value of the one or more attributes relating to payment behaviour of the consumer. The one or more attributes relating to payment behaviour of the consumer may comprise one or more of: a time of day when the consumer provided consent to complete a preceding action; a date interval within which the consumer provided consent to complete a preceding action; an indicator of a preferred payment instrument of the consumer; and an indicator of a preference of the consumer to provide consent to complete the action prior to a specified date, wherein providing consent to complete the action prior to the specified date results in a payment reduction.

The action may comprise an exchange of data other than data required to complete a specific payment action. The data exchange may comprise an exchange of personal data. The data exchange may comprise an exchange of payment data associated with the consumer.

Another aspect of the invention provides a system for requesting consent from a consumer to complete an action. The system comprises a probability processor and a request processor. The probability processor is configured to determine a time interval during which a probability of a consumer providing consent to complete the action exceeds a probability of the consumer not providing consent to complete the action. The request processor is configured to request consent from the consumer to complete the action during the time interval.

The system may comprise a digital wallet. The digital wallet may comprise the probability processor.

The term 'digital wallet' as used herein refers to a system comprising electronic components (such as one or more processors, memory devices, or servers) suitable for storing information used to complete actions. Such information may comprise actual payment credentials, tokenised payment credentials, and information relating to a specific action. The information stored by a digital wallet may be stored in an encrypted form.

The system may comprise a payment network. The payment network may comprise the probability processor. The probability processor may be hosted by an issuer of a payment device or by a third party financial technology company.

The term 'payment network' as used herein refers to a network of electronic components (such as one or more processors, memory devices, or servers) suitable for communicating between systems, such as systems hosted by different financial institutions, to complete actions. An example of a payment network is the Mastercard® payment network.

Another aspect of the invention provides a system for completing an action comprising the system of any of the above described embodiments. The system may further comprise one or more of: a payment system, a merchant system, a digital wallet, a payment network, a token service provider and an issuer system.

The term 'token service provider' as used herein refers to an entity which hosts a system comprising electronic components (such as one or more processors, memory devices, or servers) suitable for protecting information used to complete actions. A token service provider may use the process of tokenisation to replace payment credentials, for example a primary account number (PAN), belonging to a consumer with other information referred to as a 'token'. A token service provider may be capable of encrypting and decrypting information used in the completion of an action.

DETAILED DESCRIPTION

Embodiments of the invention will now be described, by way of example only, with reference to the accompanying drawings.

Figure 1:
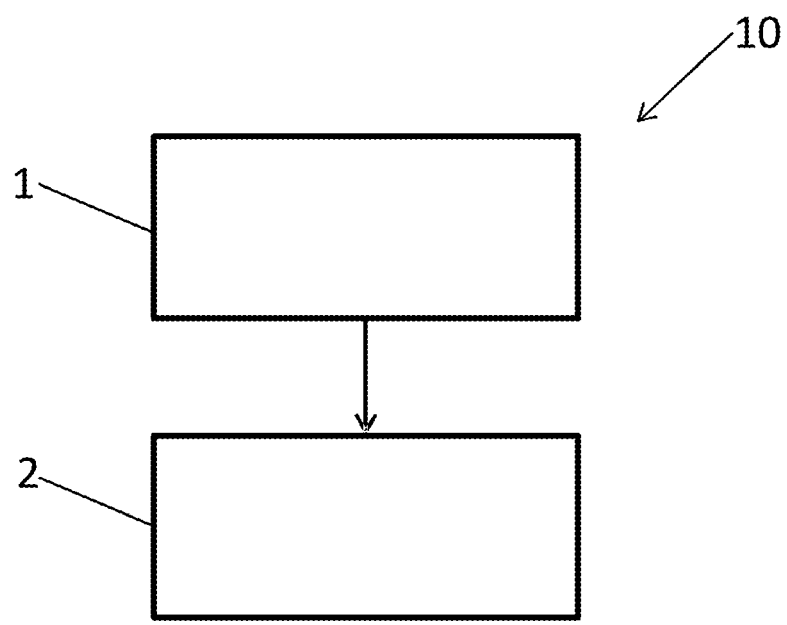
FIG. 1 shows a method of requesting consent from a consumer to complete a transaction according to an embodiment.

FIG. 1 shows a method 10 of requesting consent from a consumer to complete an action according to an embodiment. The method 10 is computer implemented. The method comprises, at step 1, determining a time interval during which a probability of the consumer providing consent to complete the action exceeds a probability of the consumer not providing consent to complete the action. The method comprises, at step 2, requesting consent from the consumer to complete the action during the time interval.

If a request for consent is sent to a consumer on any given date, there is a risk that the consumer will not be able to provide consent on the given date. For example, if consent is to be provided by means of a mobile telephone using a mobile banking application, the consumer may not have access to a mobile telephone on the given date. In another example, where the action comprises a payment transaction, the consumer may be available to provide consent, but may not have access to sufficient funds to provide consent at the time that consent is requested. This may result in multiple requests for consent needing to be sent to the consumer before consent is provided. Each request for consent may have an associated hardware, computational and/or network cost. Requesting consent from the consumer during a time interval during which a probability of the consumer providing consent exceeds a probability of the consumer not providing consent may avoid the need to send multiple requests for consent. This may enable more efficient use of hardware, computational and/or network resources.

In an example use case, the method 10 is used to complete a merchant initiated transaction. For example, a regular subscription payment may be due from the consumer to the merchant on the same day each month. For a given month, the merchant may wish to increase the payment amount. The merchant may be required to obtain consent from the consumer to complete the transaction for the increased amount before the day the payment is due. The method 10 may be utilised to minimise the number of requests for consent that are sent to the consumer before the consumer provides consent in response to a request.

In some embodiments, the method 10 may comprise requesting consent to complete multiple payment transactions. The method 10 may comprise determining the time interval of step 1 for each of the transactions. The method 10 may comprise requesting consent from the consumer to complete each of the transactions. The method 10 may comprise determining a single time interval during which the probability of the consumer providing consent to complete all of the transactions exceeds the probability of the consumer not providing consent. The method 10 may comprise requesting consent from the consumer to complete all of the transactions in a single request. In an example use case, a consumer may be able to pay for goods or services in instalments. For example, a consumer may be able to pay a deposit upon or shortly after initiation of a transaction, and pay the remainder of the payment upon or shortly before delivery of the goods or services. In this example, the method 10 may be used to determine a time interval during which a probability of the consumer providing consent to complete the transaction for the remaining payment exceeds a probability of the consumer not providing consent.

In some embodiments, the action may comprise an exchange of data other than data required to complete a specific payment transaction. In an example use case, a third party may wish to obtain data hosted by an issuer of a payment device, such as a physical payment card or a portable communications device comprising a digital wallet, held by the consumer. The consumer may be required to provide consent for the third party to obtain the data. For example, the third party may be a merchant from whom the consumer wishes to purchase age restricted goods, such as alcohol, and the data hosted by the issuer may relate to the age of the consumer. The merchant may need to access the age data of the consumer in order to verify that the consumer is old enough to purchase the goods. In this example, the method 10 may be used to determine a time interval during which a probability of the consumer providing consent for the issuer to share the data with the merchant exceeds a probability of the consumer not providing consent.

Another example of an exchange of data that may be completed using the method 10 comprises an exchange of payment data associated with the consumer not as part of an exchange of payment data during completion of a specific payment transaction. This may comprise tokenisation of the consumer's payment data, and/or registering the payment data with a secure payment service such as Mastercard Secure Remote Commerce (MSRC). An exchange of payment data may also comprise linking a secure remote commerce (SRC) account, or similar, with a specific payment device.

In another example, a third party Open Banking application developer may wish to access transaction data, or other data, hosted by a payment network, for example the Mastercard® payment network. The data may be accessed through an application programming interface (API) hosted by a payment network, for example a Mastercard® API hosted by the Mastercard Digital Enablement Service (MDES).

In another example, a merchant may require a consumer to consent to updated terms and conditions of use of a product or service. For example, a software provider may require a consumer of a piece of software to consent to updated terms and conditions of use of the piece of software. In another example, a landlord may require a consumer to consent to changes in a rental agreement.

Step 1 of the method 10 may comprise determining a value of one or more attributes. In some embodiments, step 1 of the method 10 may comprise determining a value of one or more: financial solvability attributes, personal attributes, portable communications device attributes, and/or payment behaviour attributes. Step 1 of the method 10 may comprise implementing artificial intelligence (AI) using a Boolean decision tree comprising the single predicate "Does a probability of a consumer providing consent to complete the transaction exceed a probability of the consumer not providing consent to complete the transaction?".

Figure 2A:
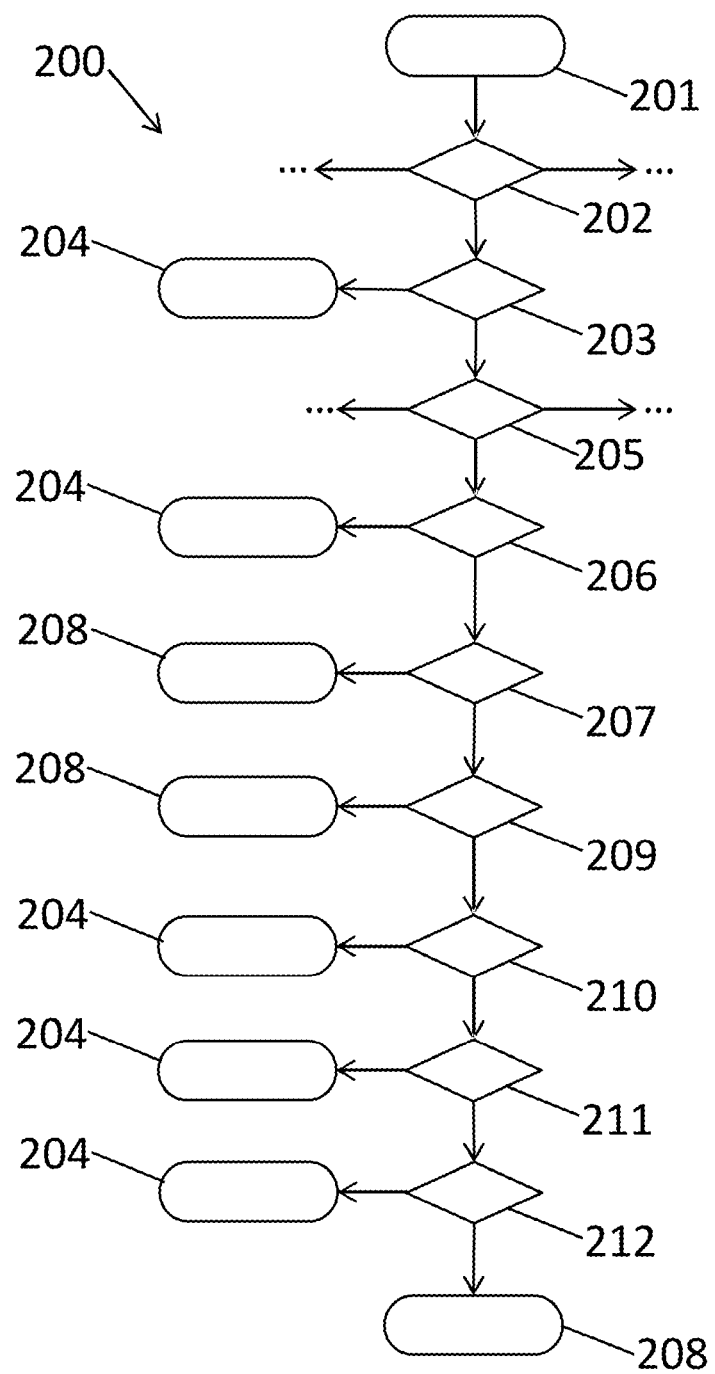
FIGS. 2a and 2b show part of a Boolean decision tree.
Figure 2B:
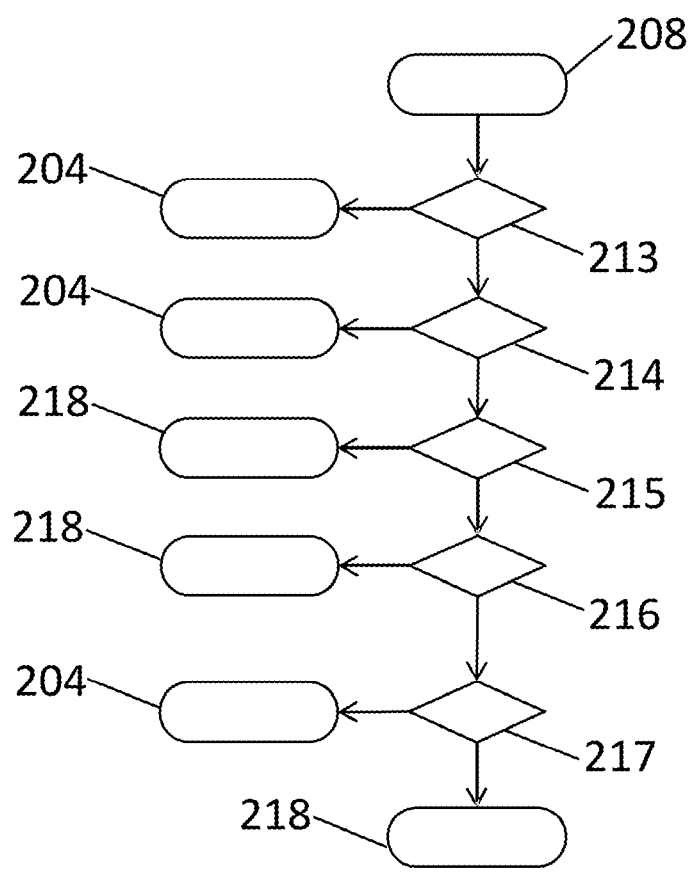

FIGS. 2a and 2b show part of an example Boolean decision tree 200 which may be used to implement step 1 of the method 10. It will be appreciated that the entire decision tree 200 is not represented herein for the sake of brevity. FIGS. 2a and 2b are merely illustrative of how a decision tree could be used to implement step 1 of the method 10. An appropriate decision tree (or set of decision trees) may be developed using machine learning techniques, such as using IDS3, CART, random forests, MARS, CHAID etc.

The decision tree 200 comprises a plurality of decisions (202, 203, 205, 206, 207, 209, 210, 211, 212, 213, 214, 215, 216 and 217) each having a plurality of possible outcomes. Each of the possible outcomes of a given one of the plurality of decisions corresponds to a value of a given attribute. Fourteen different attributes are used in the example of FIGS. 2a and 2b. These attributes are merely illustrative and any number of suitable attributes may be used to implement step 1 of the method 10. The order of the attributes as shown in FIGS. 2a and 2b is not limiting, and any suitable order of any number of suitable attributes may be used.

An example use case of the decision tree 200 will now be described in which the action is a payment transaction. It will be appreciated that a payment transaction is merely an example of an action which may require consent from a consumer to complete. The decision tree 200 may be used to carry out step 1 of the method 10 where the action is any action which requires consent from a consumer to complete.

The decision tree 200 begins at start terminator 201 with the single predicate "Does a probability of a consumer providing consent to complete a transaction exceed a probability of the consumer not providing consent to complete the transaction?" In the example of FIGS. 2a and 2b, the predicate is true for a time interval of an evening at the beginning of any given month. As explained below, any suitable time interval may be represented by an 'evening', and any suitable date interval may be represented by the 'beginning' of any given month. The predicate is true for different groups of consumers as explained below.

Following start terminator 201, the decision tree 200 comprises a first decision 202. In this example, there are three possible outcomes of the first decision 202. Each of the three possible outcomes corresponds to a value of a first attribute. In this example, the first attribute forms part of a group of attributes relating to payment behaviour of the consumer. The first attribute comprises a time of day when the consumer provided consent to complete a preceding transaction. The preceding transaction may comprise a most recent past transaction. In some examples, the preceding transaction may comprise the most recent past transaction of the same transaction type, such as a payment made to the same merchant, as the current transaction. The preceding transaction may comprise any preceding transaction suitable for answering the predicate of the start terminator 201. In this example, the three possible outcomes of the first decision 202 are 'morning', 'day' and 'evening'. In some examples, 'morning' may comprise the hours of 7 am to 9 am. In some examples, 'day' may comprise the hours of 9 am to 6 pm. In some examples, 'evening' may comprise the hours of 6 pm to 10 pm. Any suitable time interval may be assigned to each of the values 'morning', 'day' and 'evening'. In other examples, there may be more or less than three possible outcomes of the first decision 202. In some examples, the possible outcomes of the first decision 202 may be times of day other than 'morning', 'day' and 'evening'.

In the example of FIGS. 2a and 2b the outcome of the first decision 202, is 'morning'. This means that on a day when the consumer provided consent to complete a preceding transaction, the consumer provided consent within the time interval assigned to 'morning'. This outcome of the first decision 202 is represented by the arrow in FIGS. 2a and 2b which extends from decision 202 to a subsequent decision 203. The other two arrows extending from decision 202 represent the alternative possible outcomes of 'morning' and 'day'.

In this example, there are three possible outcomes to the decision 203. Each of the three possible outcomes corresponds to a value of a second attribute. In this example, the second attribute forms part of a group of attributes relating to personal attributes of the consumer. The second attribute comprises a work occupancy of the consumer. In this example, the work occupancy of the consumer is a time interval, during any given day, during which the consumer is least likely to be occupied at work. In this example, the three possible outcomes of the decision 203 are 'day', 'evening' and 'night'. In some examples, 'day' may comprise the hours of 7 am to 6 pm, 'evening' may comprise the hours of 6 pm to 10 pm, and 'night' may comprise the hours of 10 pm to 7 am. Any suitable time interval may be assigned to each of the values 'day', 'evening' or 'night'. In other examples, there may be more or less than three possible outcomes of the decision 203. In some examples, the possible outcomes of the decision 203 may be time intervals other than 'day', 'evening' and 'night'.

In the example of FIGS. 2a and 2b, the outcome of the decision 203, is 'evening'. This may mean that the consumer has a job which occupies traditional working hours. As such, the consumer may have better availability, on average, in the evening of any given day than during the day or at night. The outcome of 'evening' is represented by the arrow extending from the decision 203 to a subsequent decision 205 in FIG. 2a. The alternative outcomes of 'day' and 'night' are represented by the arrow extending from the decision 203 to an end terminator 204.

In this example, there are three possible outcomes to the decision 205. Each of the three possible outcomes corresponds to a value of a third attribute. In this example, the third attribute forms part of a group of attributes relating to payment behaviour of the consumer. The third attribute comprises a date interval within which the consumer provided consent to complete a preceding transaction. The preceding transaction may comprise the same preceding transaction as the preceding transaction of the second attribute. The preceding transaction may comprise the most recent transaction preceding the current transaction of the start terminator 201. In some examples, the preceding transaction may comprise the most recent transaction of the same type as the current transaction of the start terminator 201.

In this example, the three possible outcomes of the decision 205 are 'month beginning', 'month middle' and 'month end'. In some examples, 'month beginning' may comprise the first ten days of a given month. In some examples, 'month middle' may comprise the second ten days of a given month. In some examples, 'month end' may comprise the remaining days of a given month after the second ten days. Any suitable date interval may be assigned to each of the values 'month beginning', 'month middle' and 'month end'. In other examples, there may be more or less than three possible outcomes of the decision 205. In some examples, the possible outcomes of the decision 203 may be date intervals other than 'month beginning', 'month middle' and 'month end'.

In the example of FIGS. 2a and 2b, the outcome of the decision 205, is 'month beginning'. This means that a day on which the consumer provided consent to complete a preceding transaction fell within the date interval assigned to 'month beginning'. The outcome of 'month beginning' is represented by the arrow in FIG. 2a which extends from decision 205 to a subsequent decision 206. The other two arrows extending from decision 205 represent the alternative outcomes of 'month middle' and 'month end'.

In this example, there are three possible outcomes to the decision 206. Each of the three possible outcomes corresponds to a value of a fourth attribute. In this example, the fourth attribute forms part of a group of attributes relating to financial solvability attributes of an account designated by the consumer to provide funds to complete the transaction. The fourth attribute comprises a date interval within which a value of funds paid in to an account designated by the consumer to provide funds to complete the transaction exceeds a value of funds payable from the designated account. In this example, the three possible outcomes of the decision 206 are 'month start', 'month middle' and 'month end'. In some examples, 'month start' may comprise the first five days of a given month, 'month middle' may comprise the middle twenty days of a given month, and 'month end' may comprise the last five days of a given month. Any suitable date interval may be assigned to each of the values 'month start', 'month middle' and 'month end'. Determining the outcome of the decision 206 may comprise analysing historical data indicative of the variation of funds paid in to and payable from the designated account during any given month. In other examples, there may be more or less than three possible outcomes of the decision 206. In some examples, the possible outcomes of the decision 206 may be date intervals other than 'month start', 'month middle' and 'month end'.

In the example of FIGS. 2a and 2b, the outcome of the decision 206 is 'month start'. The outcome of 'month start' is represented by the arrow in FIG. 2a which extends from decision 206 to a subsequent decision 207. The alternative outcomes of 'month middle' and 'month end' are represented by the arrow extending from the decision 206 to an end terminator 204.

In this example, there are three possible outcomes to the decision 207. Each of the three possible outcomes corresponds to a value of a fifth attribute. In this example, the fifth attribute forms part of a group of attributes relating to financial solvability attributes of an account designated by the consumer to provide funds to complete the transaction. The fifth attribute comprises a size of a margin of an account designated by the consumer to provide funds to complete the transaction. The size of the margin is estimated for the date interval corresponding to the outcome of the preceding decision 207. In this example, therefore, the size of the margin is estimated for the date interval corresponding to 'month start'. The size of the margin may be estimated based on historical data. In this example, the three possible outcomes to the decision 207 are 'small', 'medium' and 'large'.

If the outcome of the decision 207 is 'large' or 'medium', the decision tree 200 extends to an intermediate terminator 208. The intermediate terminator 208 will be described below with reference to FIG. 2b. If the outcome of the decision 207 is 'small', the decision tree 200 extends to a subsequent decision 209.

Depending on the outcome of decision 209, the decision tree extends to the intermediate terminator 208 or a subsequent decision 210. Depending on the outcome of decision 210, the decision tree extends to an end terminator 204 or a subsequent decision 211. Depending on the outcome of decision 211, the decision tree extends to an end terminator 204 or a subsequent decision 212. Depending on the outcome of decision 212, the decision tree extends to an end terminator 204 or an intermediate terminator 208. Each of the possible outcomes of each of the decisions 209, 210, 211 and 212 corresponds to a value of a sixth, seventh, eighth and ninth attribute respectively. Each of the sixth, seventh, eighth and ninth attributes is a personal attribute of the consumer. In some examples, each personal attribute may relate to one of: an age of the consumer, a gender of the consumer, a marital status of the consumer, or an education level of the consumer. Each personal attribute may relate to any personal attribute that has been shown to have a statistical relationship with a likelihood of a consumer providing consent to complete a transaction during a given time interval.

FIG. 2b represents a branch of the decision tree 200 which may extend from any one of the intermediate terminators 208 of FIG. 2a. After the intermediate terminator 208, the decision tree extends to a decision 213. In this example, there are two possible outcomes to the decision 213. Each of the two possible outcomes corresponds to a value of a tenth attribute. In this example, the fourth attribute forms part of a group of attributes relating to attributes of a portable communications device associated with the consumer. In this example, the tenth attribute comprises a power status of a portable communications device associated with the consumer. The portable communications device may be a device which the consumer has designated to receive a request for consent to complete a transaction. In the example of FIGS. 2a and 2b, the power status comprises whether or not the device is switched on. The two possible outcomes of the decision 213 are 'yes' (the device is switched on) and 'no' (the device is not switched on). In some examples, the power status may comprise whether or not a battery of the device has a state of charge above or below a predetermined threshold.

The outcome of the decision 213 may be determined for a given time interval. For example, an outcome of 'yes' of the decision 213 may mean that it is more likely that the device will be switched on during a given time interval than switched off. In the example of FIGS. 2a and 2b, the given time interval may correspond to an evening at the beginning of any given month, as per the outcome of decisions 203, 205 and 206. The outcome of the decision 213 may be determined using historical data relating to a power status of the device. In some examples, the outcome of the decision 213 may be definitive for a given moment in time. For example, the time interval of step 1 of the method 10 may be determined using one or more of the other decisions 202-212 of the decision tree 200. Decision 213 may then be implemented at any given moment in time within the time interval, to determine whether or not to request consent from the consumer to complete a transaction at the given moment in time. If the outcome of decision 213 is 'no' at a given moment time within the time interval, requesting consent from the consumer may be delayed until a later moment in time when the outcome of decision 213 is 'yes'.

In the example of FIGS. 2a and 2b, the outcome of the decision 213, is 'yes'. The outcome of 'yes' is represented by the arrow extending from the decision 213 to a subsequent decision 214. The alternative outcome of 'no' is represented by the arrow extending from the decision 213 to an end terminator 204.

In this example, there are two possible outcomes to the decision 214. Each of the two possible outcomes corresponds to a value of an eleventh attribute. In this example, the eleventh attribute forms part of a group of attributes relating to attributes of a portable communications device associated with the consumer. In this example, the eleventh attribute comprises a location of the portable communications device associated with the consumer. In the example of FIGS. 2a and 2b, the decision 214 determines whether or not the device is located within a permitted location. A permitted location may be any location within which the transaction can be completed. The two possible outcomes of the decision 214 are 'yes' (the device is in a permitted location) and 'no' (the device is not in a permitted location).

The outcome of the decision 214 may be determined for a given time interval. For example, an outcome of 'yes' of the decision 214 may mean that it is more likely that the device will be in a permitted location during a given time interval than not be in a permitted location. In the example of FIGS. 2a and 2b, the given time interval may correspond to an evening at the beginning of any given month, as per the outcome of decisions 203, 205 and 206. The outcome of the decision 214 may be determined using historical data relating to a location of the device. In some examples, the outcome of the decision 214 may be definitive for a given moment in time. For example, the time interval of step 1 of the method 10 may be determined using one or more of the other decisions 202-212 of the decision tree 200. Decision 214 may then be implemented at any given moment in time within the time interval, to determine whether or not to request consent from the consumer to complete a transaction at the given moment in time. If the outcome of decision 214 is 'no' at a given moment time within the time interval, requesting consent from the consumer may be delayed until another moment in time when the outcome of decision 214 is 'yes'.

In the example of FIGS. 2a and 2b, the outcome of the decision 214, is 'yes'. The outcome of 'yes' is represented by the arrow extending from the decision 214 to a subsequent decision 215. The alternative outcome of 'no' is represented by the arrow extending from the decision 214 to an end terminator 204.

In this example, there are two possible outcomes to the decision 215. Each of the two possible outcomes corresponds to a value of a twelfth attribute. In this example, the eleventh attribute forms part of a group of attributes relating to payment behaviour of the consumer. In this example, the twelfth attribute comprises an indicator of a preferred payment instrument of the consumer. In the example of FIGS. 2a and 2b, the indicator comprises whether or not the consumer prefers credit to complete a given transaction. The two possible outcomes of the decision 215 are 'yes' (the consumer does prefer credit) and 'no' (the consumer does not prefer credit). If the outcome of decision 215 is 'yes', the decision tree 200 extends to an end terminator 218. If the outcome of the decision 215 is 'no', the decision tree 200 extends to a subsequent decision 216.

In this example, there are two possible outcomes to the decision 216. Each of the two possible outcomes corresponds to a value of a thirteenth attribute. In this example, the thirteenth attribute forms part of a group of attributes relating to payment behaviour of the consumer. In this example, the thirteenth attribute comprises an indicator of a preference of the consumer to provide consent to complete the transaction prior to a specified date. Providing consent to complete the transaction prior to the specified date may result in a payment reduction. In the example of FIGS. 2a and 2b, the indicator comprises whether or not the consumer is likely to prefer to complete the transaction prior to the specified date. The two possible outcomes of the decision 215 are 'yes' (the consumer is likely to prefer to complete the transaction prior to the specified date) and 'no' (the consumer is not likely to prefer to complete the transaction prior to the specified date). The outcome of decision 216 may be determined using historical data to determine if the consumer has previously demonstrated a preference for completing a transaction prior to a specified date to obtain a payment reduction. If the outcome of decision 215 is 'no', the decision tree 200 extends to an end terminator 218. If the outcome of the decision 215 is 'yes', the decision tree 200 extends to a subsequent decision 217.

In this example, there are two possible outcomes to the decision 217. Each of the two possible outcomes corresponds to a value of a fourteenth attribute. In this example, the fourteenth attribute forms part of a group of attributes relating to payment behaviour of the consumer. In this example, the fourteenth attribute comprises whether or not providing consent to complete the transaction prior to a specified date will result in a payment reduction. The two possible outcomes of the decision 217 are 'yes' (providing consent to complete the transaction prior to a specified date will result in a payment reduction) and 'no' (providing consent to complete the transaction prior to a specified date will not result in a payment reduction). In the example of FIGS. 2a and 2b, the outcome of the decision 217 is 'yes'. The outcome of 'yes' is represented by the arrow extending from the decision 217 to an end terminator 218. The alternative outcome of 'no' is represented by the arrow extending from the decision 217 to an end terminator 204.

Each of the end terminators 218 represents the completion of step 1 of the method 10. In the example described above, the time interval determined in step 1 of the method 10 is an evening at the beginning of any given month. In the above example, this time interval may be determined for a consumer having an account, designated to provided funds to complete the transaction, with a medium or large margin, who has a portable communications device which is likely to be switched on in a permitted location during an evening at the beginning of any given month, and who prefers credit as a payment instrument to complete a given transaction. In another example, a time interval of an evening at the beginning of any given month may be determined for a consumer having an account with a small margin, but who has certain personal attributes which mean that they are statistically more likely than not to provide consent for the transaction during the time interval. The predicate of the decision tree 200 is therefore true for the time interval of an evening at the beginning of any given month for different groups of consumers.

Figure 3:
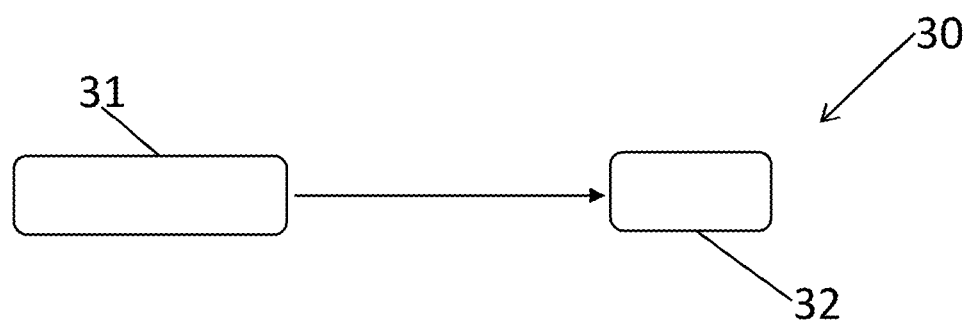
FIG. 3 shows a system for requesting consent from a consumer to complete a transaction according to an embodiment.

FIG. 3 shows a system 30, for requesting consent from a consumer to complete an action, according to an embodiment. The system 30 may be used to implement the method 10 described above. The system 30 comprises a probability processor 31 and a request processor 32. The probability processor 31 is configured to determine a time interval during which a probability of a consumer providing consent to complete the action exceeds a probability of the consumer not providing consent to complete the action. The request processor 32 is configured to request consent from the consumer to complete the action during the time interval.

In the example of FIG. 3, the probability processor 31 and the request processor 32 are arranged as separate processors. The system 30 further comprises a communication link between the probability processor 31 and the request processor 32, as indicated by the arrow extending from the probability processor 31 to the request processor 32 in FIG. 3. This enables the time interval to be communicated from the probability processor 31 to the request processor 32. The communication link may be provided by a cloud system, a mobile network or any other suitable communications system.

In other examples, the probability processor 31 and the request processor 32 are arranged as a single processor. The probability processor 31 and the request processor 32 may each form part of a separate system, or the probability processor 31 and the request processor 32 may form part of the same system.

In some examples, the request processor 32 may be configured to communicate with a portable communications device, such as a mobile phone or tablet, belonging to the consumer in order to request consent from the consumer. The system 30 may comprise a processor configured to receive consent from the consumer if the consumer provides consent. The processor configured to receive consent from the consumer may be the request processor 32 or a separate processor.

The system 30 may comprise a processor configured to communicate that the consumer has not responded to the request for consent or the consumer has rejected the request for consent. This processor may be the request processor 32 or a separate processor. The system 30 may be configured to communicate to the probability processor 31 that the consumer has not responded to the request for consent or the consumer has rejected the request for consent. The time interval determined by the probability processor 31 may comprise a first time interval, and the probability processor 31 may be further configured to determine a second time interval (during which a probability of the consumer providing consent to complete the action exceeds a probability of the consumer not providing consent to complete the action) if the consumer does not respond to the request for consent sent during the first time interval, or if the consumer rejects the request for consent sent during the first time interval.

The probability processor 31 may be configured to determine a plurality of time intervals during which a probability of the consumer providing consent to complete the action exceeds a probability of the consumer not providing consent to complete the action. The request processor 32 may be configured to first request consent from the consumer to complete the action during a first time interval, wherein the probability of the consumer providing consent to complete the action is highest during the first time interval. The request processor 32 may be further configured to request consent from the consumer to complete the action during a second time interval of the plurality of time intervals, wherein the probability of the consumer providing consent to complete the action is second highest during the second time interval, if the consumer does not respond to the request for consent sent during the first time interval, or if the consumer rejects the request for consent sent during the first time interval.

Figure 4:
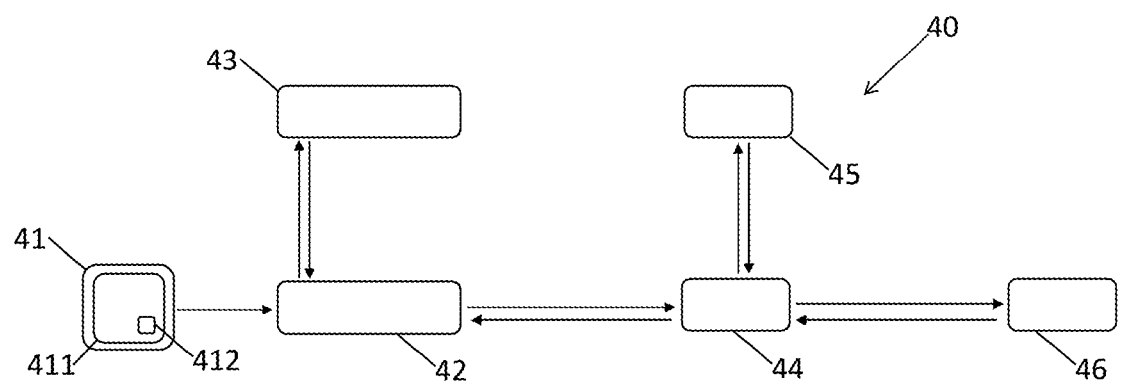
FIG. 4 shows a system for completing a transaction.

FIG. 4 shows a system 40 for completing an action, such as a payment transaction. The system 40 comprises elements including: a payment system 41, a merchant system 42, a digital wallet 43, a payment network 44, a token service provider 45 and an issuer system 46. Each arrow shown in FIG. 4 represents a direction of communication between elements of the system 40. For example, the system 40 is configured with two-way communication between the merchant system 42 and the digital wallet 43. In the example of FIG. 4, one-way communication is provided from the payment system 41 and the merchant system 42. In some embodiments, two-way communication may be provided between payment system 41 and the merchant system 42, for example to facilitate refunds of payments. The communication links between the elements of the system 40 may be provided by a cloud system, a mobile network or any other suitable communications system.

In the example of FIG. 4, the payment system 41 comprises a payment device 411. The payment device 411 comprises a portable communications device comprising a digital device wallet 412. The digital device wallet 412 is configured to store a payment token, for example a payment token provided by the token service provider 45. In other examples, the payment device 411 may comprise a physical card, such as a credit card, debit card or prepaid card. In such examples, the digital device wallet 412, the digital wallet 43 and the token service provider 45 are not present.

In some examples, an acquirer system may be provided in communication with the merchant system 42 and the payment network 44. In some examples, the payment network 44 may comprise the Mastercard® payment network.

The digital wallet 43 may be hosted by a third party service such as Apple Pay®, Google Pay® or a Secure Remote Commerce (SRC) click-to-pay service.

The token service provider 45 may be part of the Mastercard Digital Enablement Service (MDES). In other examples, the payment network 44 acts as a token service provider and the separate token service provider 45 is not present.

In an example use case, the system 40 is used to complete a payment transaction. In the example use case, the payment system 41 is operated by a cardholder, the merchant system 42 is operated by a merchant, and the issuer system 46 is operated by an issuer. The cardholder may be the consumer of the method 10 described above. The payment token stored by the digital device wallet 412 is a tokenisation of payment credentials of the cardholder. In examples comprising an acquirer system, the acquirer system may be operated by an acquirer. In the example use case, a transaction is initiated by the cardholder. A payment token stored in the digital device wallet 412 is sent from the payment device 411 to the merchant system 42.

After receiving the payment token, the merchant requests payment credentials from the digital wallet 43. The payment token is sent from the merchant system 42 to the digital wallet 43. The payment token is then verified by the digital wallet 43. After verifying the payment token, a transaction cryptogram is generated by the digital wallet 43. In other examples, the transaction cryptogram is generated by the payment system 41. For example, the payment device 411 may comprise a secure element (SE) configured to generate the transaction cryptogram. In some examples, the payment device 411 may be configured to utilise a cloud based system, such as the Mastercard® Cloud Based Payments (MCBP) system, to generate the transaction cryptogram. In examples wherein the transaction cryptogram is generated by the payment system 41, the digital wallet 43 may not be present. In examples in which the payment device 411 comprises a physical card, the transaction cryptogram may be generated by an external server in place of the digital wallet 43. The external server may be in communication with a point-of-sale device of the payment system 41.

The transaction cryptogram comprises transaction information required to complete the transaction. In some examples, the transaction information comprises the payment amount associated with the transaction and/or the time at which the transaction was initiated. In some examples, the transaction information may comprise a maximum payment amount for which the cardholder provides their consent. In some examples, the transaction cryptogram may comprise a digital signature. The digital signature may be generated using a private key or a symmetric key. The private or symmetric key may be held by the digital wallet 43, the payment system 41, for example by a secure element of the payment device 411, or by an external server in communication with a point-of-sale device. The transaction cryptogram may be digitally bound to a unique identifier associated with the merchant.

In some examples, the cryptogram may form part of authentication data communicated using a Universal Cardholder Authentication Field™ (UCAF) in a 3D-Secure protocol. For example, the cryptogram may form part of an Accountholder Authentication Value (AAV) used in the Mastercard™ SecureCode™ protocol. The cryptogram may form part of a transaction authorisation message or a financial request message.

The transaction cryptogram is then sent from the digital wallet 43 to the merchant system 42. The payment token is returned to the merchant system 42 from the digital wallet 43 alongside the transaction cryptogram. The merchant system 42 may store a token unique reference of the payment token, for example in order to initiate future transactions. When the merchant wishes to complete the transaction, the merchant sends an authorisation request from the merchant system 42 to the payment network 44. In examples comprising an acquirer system, the authorisation request may be sent to the payment network 44 via the acquirer system. The payment network 44 then sends the transaction cryptogram to the token service provider 45. The token service provider 45 decrypts the transaction cryptogram to obtain the transaction information. In examples in which the transaction cryptogram comprises a digital signature generated using a private key, the transaction cryptogram is decrypted using a corresponding public key. The corresponding public key may be held by the token service provider 45.

In examples in which the payment network 44 acts as a token service provider, the transaction cryptogram may be decrypted by the payment network 44. In examples in which the transaction cryptogram comprises a digital signature generated using a private key, the corresponding public key may be held by the payment network 44.

Once the transaction cryptogram is decrypted, the transaction information is then sent to the payment network 44. The payment network 44 verifies the transaction information and sends the authorisation request to the issuer system 46. The issuer system 46 then provides authorisation to complete the transaction. The authorisation is sent to the merchant system 42 via the payment network 44. In examples comprising an acquirer system, the authorisation may be sent to the merchant system 42 via the acquirer system.

Figure 5:
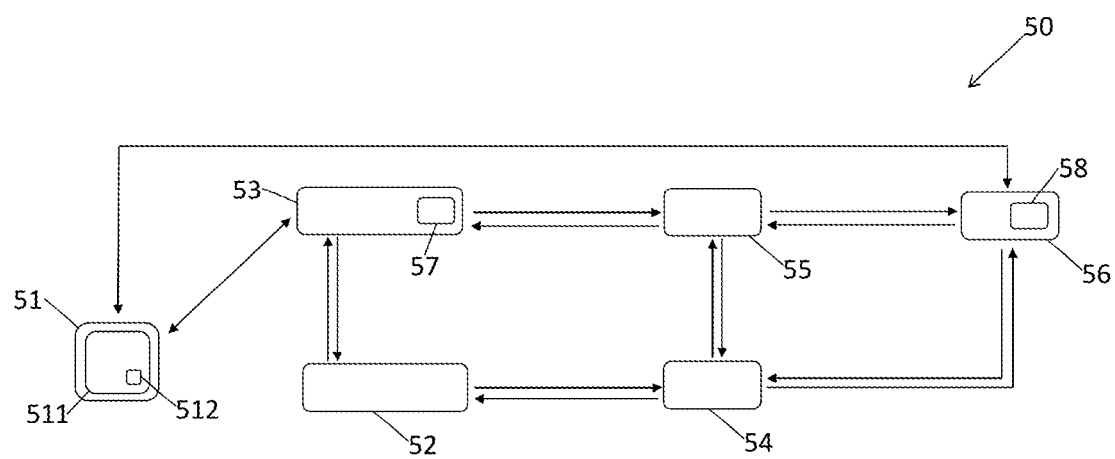
FIG. 5 shows a system for completing a transaction according to an embodiment.

FIG. 5 shows a system 50, for completing an action such as a payment transaction, according to an embodiment. The system 50 may be used to implement the method 10 described above. It will be appreciated that the system 50 is merely an example system according to an embodiment that could be used to implement the method 10. Alternative systems according to other embodiments may be used to implement the method 10.

The system 50 comprises elements including: a payment system 51, a merchant system 52, a digital wallet 53, a payment network 54, a token service provider 55 and an issuer system 56. Each arrow shown in FIG. 5 represents a direction of communication between elements of the system 50. For example, the system 50 is configured with two-way communication between the digital wallet 53 and the token service provider 55. The communication links between the elements of the system 50 may be provided by a cloud system, a mobile network or any other suitable communications system.

The system further comprises a probability processor 57 and a request processor 58. The probability processor 57 is configured to determine a time interval during which a probability of a consumer providing consent to complete the transaction exceeds a probability of the consumer not providing consent to complete the transaction. The request processor 58 is configured to request consent from the consumer to complete the transaction during the time interval. In the example of FIG. 5, the digital wallet 53 comprises the probability processor 57, and the issuer system 56 comprises the request processor 58. In other examples, other elements of the system 50 may comprise the probability processor 57 and the request processor 58. For example, the payment network 54 may comprise the probability processor 57.

In the example of FIG. 5, the payment system 51 comprises a payment device 511. The payment device 511 comprises a portable communications device comprising a digital device wallet 512. The digital device wallet 512 is configured to store a payment token, for example a payment token provided by the token service provider 55. In other examples, the payment device 511 may comprise a physical card, such as a credit card, debit card or prepaid card. In such examples, the digital device wallet 512, the digital wallet 53 and the token service provider 55 are not present.

In the example of FIG. 5, the merchant system 52 is configured to store a token unique reference of a payment token. In some examples, an acquirer system may be provided in communication with the merchant system 52 and the payment network 54. In some examples, the payment network 54 may comprise the Mastercard® payment network.

The digital wallet 53 may be hosted by a third party service such as Apple Pay®, Google Pay® or a Secure Remote Commerce (SRC) click-to-pay service.

The token service provider 55 may be part of the Mastercard Digital Enablement Service. In other examples, the payment network 54 acts as a token service provider and the separate token service provider 55 is not present.

In an example use case, the system 50 is used to complete a payment transaction. In the example use case, the payment system 51 is operated by a cardholder, the merchant system 52 is operated by a merchant, and the issuer system 56 is operated by an issuer. The cardholder may be the consumer of the method 10 described above. The payment token stored by the digital device wallet 512 is a tokenisation of payment credentials of the cardholder. In examples comprising an acquirer system, the acquirer system may be operated by an acquirer. In the example use case, a transaction is initiated by the merchant and the cardholder is required to consent to completing the transaction. For example, a regular subscription payment may be due from the cardholder to the merchant on the same day each month. For a given month, the merchant may wish to increase the payment amount. The merchant may be required to obtain consent from the consumer to complete the transaction for the increased amount before the day the payment is due.

In the example use case, the merchant system 52 has stored a token unique reference of the payment token also stored by the digital device wallet 512. The token unique reference may have been stored following a previous transaction between the cardholder and the merchant. In some examples, the merchant system 52 of the system 50 is also the merchant system 42 of the system 40. In other examples, the merchant system 52 of the system 50 is in communication with the merchant system 42 of the system 40. The token unique reference may therefore have been stored following a previous transaction initiated by the cardholder using the system 40, on any other transaction between the cardholder and the merchant.

The merchant initiates the transaction by requesting consent from the cardholder to complete the transaction. In the embodiment of FIG. 5, this is achieved by sending a request for consent from the merchant system 52 to the digital wallet 53. The merchant may initiate the transaction some time before needing to complete the transaction. In the example of a price increase of a regular subscription payment, the merchant may initiate the transaction sometime between deciding to implement the price increase and the date on which the next payment is due.

The request for consent is sent to the digital wallet 53 along with the token unique reference stored by the merchant system 52. The probability processor 57 then determines a time interval during which a probability of the consumer providing consent to complete the transaction exceeds a probability of the consumer not providing consent to complete the transaction. The time interval may be determined using step 1 of the method 10 described above. This may be implemented using the decision tree 200 described above. Once the time interval has been determined, the request for consent together with the time interval are sent to the token service provider 55. The request for consent and the time interval are then sent from the token service provider 55 to the issuer system 56. The request processor 58 then sends the request for consent to the payment system 51 at a time during the time interval.

The request for consent may be presented to the cardholder by means of the portable communications device of the payment device 511. For example, the request for consent may be presented to the cardholder by means of an SMS message or by means of a notification via a mobile banking application. The cardholder may provide consent to complete the transaction by means of the portable communications device. For example, the consumer may provide consent by accepting the request for consent via a mobile banking application. After the cardholder has provided consent to complete the transaction, the consent is sent from the payment system 51 to the issuer system 56. The consent is then sent from the issuer system 56 to the token service provider 55. The consent is then sent from the token service provider 55 to the digital wallet 53.

The system 50 may comprise a processor configured to communicate that the cardholder has not responded to the request for consent or the cardholder has rejected the request for consent. This processor may be the request processor 58 or a separate processor. The system 50 may be configured to communicate to the probability processor 57 that the cardholder has not responded to the request for consent or the cardholder has rejected the request for consent. The time interval determined by the probability processor 57 may comprise a first time interval, and the probability processor 57 may be further configured to determine a second time interval (during which a probability of the cardholder providing consent to complete the action exceeds a probability of the cardholder not providing consent to complete the action) if the cardholder does not respond to the request for consent sent during the first time interval, or if the cardholder rejects the request for consent sent during the first time interval.

The probability processor 57 may be configured to determine a plurality of time intervals during which a probability of the cardholder providing consent to complete the action exceeds a probability of the cardholder not providing consent to complete the action. The request processor 58 may be configured to first request consent from the cardholder to complete the action during a first time interval, wherein the probability of the cardholder providing consent to complete the action is highest during the first time interval. The request processor 58 may be further configured to request consent from the cardholder to complete the action during a second time interval of the plurality of time intervals, wherein the probability of the cardholder providing consent to complete the action is second highest during the second time interval, if the cardholder does not respond to the request for consent sent during the first time interval, or if the cardholder rejects the request for consent sent during the first time interval.

A transaction cryptogram is then generated by the digital wallet 53. In other examples, the transaction cryptogram is generated by the payment device 51. For example, the payment device 511 may comprise a secure element (SE) configured to generate the transaction cryptogram. In some examples, the payment device 511 may be configured to utilise a cloud based system, such as the Mastercard® Cloud Based Payments (MCBP) system, to generate the transaction cryptogram. In examples wherein the transaction cryptogram is generated by the payment system 51, the digital wallet 53 may not be present. In examples in which the payment device 511 comprises a physical card, the transaction cryptogram may be generated by an external server, in place of the digital wallet 53. The external server may be in communication with a point-of-sale device of the payment system 51.

The transaction cryptogram comprises transaction information comprising the consent provided by the cardholder. The transaction information may further comprise a payment amount associated with the transaction, such as a maximum payment amount for which the cardholder provides their consent, and/or any other information required to complete the transaction. In some examples, the transaction cryptogram may comprise a digital signature. The digital signature may be generated using a private key or a symmetric key. The private or symmetric key may be held by the digital wallet 53, the payment device 511, for example by a secure element of the payment device 41, or by an external server in communication with a point-of-sale device. The transaction cryptogram may be digitally bound to a unique identifier associated with the merchant.

The transaction cryptogram may be stored by the digital wallet 53. The merchant may then request the transaction cryptogram from the digital wallet 53, using the merchant system 52, at some time prior to needing to complete the transaction. In the example of a price increase of a regular subscription payment, the merchant may request the transaction cryptogram prior to the date on which the next payment is due. In other examples, the transaction cryptogram is automatically sent from the digital wallet 53 to the merchant system 52 upon generation of the transaction cryptogram. In examples wherein the transaction cryptogram is generated by the payment device 511, the transaction cryptogram may not be sent from the payment system 51 to the issuer system 56 and on to the digital wallet 53 as described above. The transaction cryptogram may be sent directly from the payment device 51 to the digital wallet 53, or directly from the payment device 51 to the merchant system 52.

The payment token is returned to the merchant system 52 from the digital wallet 53 alongside the transaction cryptogram. When the merchant wishes to complete the transaction, the merchant sends an authorisation request from the merchant system 52 to the payment network 54. The authorisation request comprises the transaction cryptogram. In examples comprising an acquirer system, the authorisation request may be sent to the payment network 54 via the acquirer system. The payment network 54 then sends the transaction cryptogram to the token service provider 55. The token service provider 55 decrypts the transaction cryptogram to obtain the transaction information. In examples in which the transaction cryptogram comprises a digital signature generated using a private key, the transaction cryptogram is decrypted using a corresponding public key. The corresponding public key may be held by the token service provider 55.

In examples in which the payment network 54 acts as a token service provider, the transaction cryptogram may be decrypted by the payment network 54. In examples in which the transaction cryptogram comprises a digital signature generated using a private key, the corresponding public key may be held by the payment network 54.

Once the transaction cryptogram is decrypted, the transaction information is then sent to the payment network 54. The payment network 54 then verifies the authorisation request and sends the authorisation request to the issuer system 56. The issuer system 56 then provides authorisation to complete the transaction. The authorisation is sent to the merchant system 52 via the payment network 54. In examples comprising an acquirer system, the authorisation may be sent to the merchant system 52 via the acquirer system.

Although the system 50 has been described above with respect to a single payment transaction, it will be appreciated the system 50 may also be used to complete multiple payment transactions. For example, the system 50 may be used to complete multiple payment transactions as described above with reference to the method 10. The system 50 may also be used to complete data transactions, for example as described above with reference to the method 10.

The merchant systems, acquirer systems and/or issuer systems described above may comprise one or more processors, servers and other computational equipment hosted by a merchant, and acquirer and an issuer respectively.

Although specific examples have been described, variations are possible, within the scope of the appended claims.

The invention claimed is:

1. A computer implemented method of requesting consent from a consumer to complete an action, the method comprising:
   utilizing an artificial intelligence (AI) component, creating by a processor, a decision tree including a plurality of decisions each having a plurality of possible outcomes based on a value of an attribute, the attribute representing a part of historical data related to an availability of the consumer to provide a consent to complete a preceding transaction during a time interval, the plurality of decisions and an order in which the plurality of decisions is arranged within the created decision tree being selected by inputting historical data into an algorithm, and the AI component being developed using machine learning techniques comprising one or more of the following: Iterative Dichotomiser 3 (IDS3), Classification and Regression Trees (CART), random forests, Multivariate Adaptive Regression Splines (MARS), and Chi-squared Automatic Interaction Detection (CHAID);
   determining, by the processor, using the created decision tree, a time interval during which a probability of the consumer providing a consent to complete the action exceeds a probability of the consumer not providing the consent to complete the action;
   based on the determined time interval, requesting, by the processor via a network, the consent from the consumer to complete the action during the determined time interval;
   receiving, by the processor via the network, the consent from the consumer; and
   completing, by the processor, the action based on the received consent.

2. The method of claim 1, wherein the created decision tree further includes one or more of a plurality of personal attributes of the consumer that are shown to have a statistical relationship with a likelihood of a consumer providing consent to complete the action during the determined time interval, the one or more of the plurality of personal attributes including an age of the consumer, a gender of the consumer, a marital status of the consumer, and an education level of the consumer.

3. The method of claim 1 further comprising determining a value of one or more personal attributes of the consumer, wherein the one or more personal attributes includes an indicator of a preferred payment instrument of the consumer.

4. The method of claim 1, further comprising determining, by the processor, using the created decision tree, a probability that a portable communications device associated with the consumer is located at a permitted location during the determined time interval, and
   requesting, by the processor via a network, the consent from the consumer to complete the action based on the probability that the portable communications device associated with the consumer is located at the permitted location during the determined time interval.

5. The method of claim 1, wherein the action comprises one or more of:
   a payment transaction;
   an exchange of data; and
   an update to terms and conditions of an agreement.

6. The method of claim 1, comprising determining a value of one or more attributes of the portable communications device associated with the consumer, and determining a time interval based on the value of the one or more attributes of the portable communications device associated with the consumer.

7. The method of claim 1, wherein the portable communications device is likely to be switched on in the permitted location during the determined time interval.

8. The method of claim 1, comprising determining a value of one or more attributes relating to payment behaviour of the consumer, and determining the time interval based on the value of the one or more attributes relating to payment behaviour of the consumer.

9. The method of claim 8, wherein the one or more attributes relating to payment behaviour of the consumer comprises one or more of:
   a time of day when the consumer provided consent to complete a preceding action;
   a date interval within which the consumer provided consent to complete a preceding action; and
   an indicator of a preference of the consumer to provide consent to complete the action prior to a specified date, wherein providing consent to complete the action prior to the specified date results in a payment reduction.

10. The method of claim 1, wherein the action comprises an exchange of data other than data required to complete a specific payment action.

11. The method of claim 10, wherein the exchange of data comprises an exchange of personal data relating to the consumer or an exchange of payment data associated with the consumer.

12. A system for requesting consent from a consumer to complete an action, the system comprising:
   a network;
   at least one memory;
   one or more processors, operationally coupled to the at least one memory, and configured to perform operations comprising:
   utilizing an artificial intelligence (AI) component, creating a decision tree including a plurality of decisions each having a plurality of possible outcomes based on a value of an attribute, the attribute representing a part of historical data related to an availability of the consumer to provide a consent to complete a preceding transaction during a time interval, the plurality of decisions and an order in which the plurality of decisions is arranged within the created decision tree being selected by inputting historical data into an algorithm, and the AI component being developed using machine learning techniques comprising one or more of the following: Iterative Dichotomiser 3 (IDS3), Classification and Regression Trees (CART), random forests, Multivariate Adaptive Regression Splines (MARS), and Chi-squared Automatic Interaction Detection (CHAID);

determining, using the created decision tree, a time interval during which a probability of the consumer providing a consent to complete the action exceeds a probability of the consumer not providing the consent to complete the action;

based on the determined time interval, requesting, via a network, the consent from the consumer to complete the action during the determined time interval;

receiving, via the network, the consent from the consumer; and completing, the action based on the received consent.

13. The system of claim 12, wherein the created decision tree further includes one or more of a plurality of personal attributes of the consumer that are shown to have a statistical relationship with a likelihood of a consumer providing consent to complete the action during the determined time interval, the one or more of the plurality of personal attributes including an age of the consumer, a gender of the consumer, a marital status of the consumer, and an education level of the consumer.

14. The system of claim 12, wherein the action comprises one or more of:
a payment transaction;
an exchange of data; and
an update to terms and conditions of an agreement.

15. The system of claim 12, wherein the one or more processors are configured to further perform operations comprising:
determining a value of one or more attributes of a portable communications device associated with the consumer, and determining the time interval based on the value of the one or more attributes of the portable communications device associated with the consumer.

16. The system of claim 12, wherein the one or more processors are configured to further perform an operation comprising determining a value of one or more personal attributes of the consumer, wherein the one or more personal attributes includes an indicator of a preferred payment instrument of the consumer.

17. One or more non-transitory computer readable media having computer readable instructions, that when executed by at least one processor cause the processor to:
utilizing an artificial intelligence (AI) component, create a decision tree including a plurality of decisions each having a plurality of possible outcomes based on a value of an attribute, the attribute representing a part of historical data related to an availability of the consumer to provide a consent to complete a preceding transaction during a time interval, the plurality of decisions and an order in which the plurality of decisions is arranged within the created decision tree being selected by inputting historical data into an algorithm, and the AI component being developed using machine learning techniques comprising one or more of the following: Iterative Dichotomiser 3 (IDS3), Classification and Regression Trees (CART), random forests, Multivariate Adaptive Regression Splines (MARS), and Chi-squared Automatic Interaction Detection (CHAID);

determine, using the created decision tree, a time interval during which a probability of the consumer providing a consent to complete the action exceeds a probability of the consumer not providing the consent to complete the action;

based on the determined time interval, request, via a network, the consent from the consumer to complete the action during the determined time interval;

receive, via the network, the consent from the consumer; and complete, the action based on the received consent.

18. The one or more non-transitory computer readable media of claim 17, wherein the created decision tree further includes one or more of a plurality of personal attributes of the consumer that are shown to have a statistical relationship with a likelihood of a consumer providing consent to complete the action during the determined time interval, the one or more of the plurality of personal attributes including an age of the consumer, a gender of the consumer, a marital status of the consumer, and an education level of the consumer.

19. The one or more non-transitory computer readable media of claim 17, wherein the computer readable instructions, when executed by the at least one processor further cause the processor to:
determine, via the network, a value of one or more attributes of a portable communications device associated with the consumer, and determine the time interval based on the value of the one or more attributes of the portable communications device associated with the consumer.

20. The one or more non-transitory computer readable media of claim 17, wherein the computer readable instructions, when executed by the at least one processor further cause the processor to: determine a value of one or more personal attributes of the consumer, wherein the one or more personal attributes includes an indicator of a preferred payment instrument of the consumer.

\* \* \* \* \*